US007568008B2

(12) United States Patent
Jain et al.

(10) Patent No.: US 7,568,008 B2
(45) Date of Patent: Jul. 28, 2009

(54) METHODS FOR SENDING ADDITIONAL JOURNALING E-MAIL MESSAGES SUBSEQUENT TO SENDING ORIGINAL JOURNALING E-MAIL MESSAGES

(75) Inventors: Chandresh K. Jain, Sammamish, WA (US); Daniel D. Longley, Bellevue, WA (US); James H. Baker, Sammamish, WA (US); Massimiliano Ciccotosto, Kirkland, WA (US); Wilbert De Graaf, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 693 days.

(21) Appl. No.: 11/046,110

(22) Filed: Jan. 28, 2005

(65) Prior Publication Data
US 2006/0075051 A1  Apr. 6, 2006

Related U.S. Application Data

(63) Continuation of application No. 10/945,058, filed on Sep. 20, 2004.

(51) Int. Cl.
G06F 15/16 (2006.01)
(52) U.S. Cl. .................................... 709/206
(58) Field of Classification Search .................. 709/206
See application file for complete search history.

(56) References Cited

U.S. PATENT DOCUMENTS

| 5,659,746 | A  | * | 8/1997  | Bankert et al.  | 707/205  |
|-----------|----|---|---------|-----------------|----------|
| 6,105,056 | A  | * | 8/2000  | Gilchrist et al.| 709/206  |
| 6,163,809 | A  | * | 12/2000 | Buckley         | 709/237  |
| 6,317,751 | B1 | * | 11/2001 | Yeger et al.    | 707/104.1|
| 6,539,385 | B1 |   | 3/2003  | Pollack         |          |
| 6,553,425 | B1 | * | 4/2003  | Shah et al.     | 709/245  |
| 6,609,138 | B1 | * | 8/2003  | Merriam         | 707/204  |
| 6,775,696 | B1 | * | 8/2004  | Hansen          | 709/219  |
| 6,810,408 | B1 | * | 10/2004 | Bates et al.    | 709/200  |
| 7,095,829 | B2 | * | 8/2006  | Claudatos et al.| 379/88.22|
| 7,231,427 | B1 | * | 6/2007  | Du              | 709/206  |
| 7,274,476 | B2 | * | 9/2007  | Eguchi et al.   | 358/1.15 |
| 7,277,695 | B2 | * | 10/2007 | Petry et al.    | 455/414.1|
| 7,330,536 | B2 | * | 2/2008  | Claudatos et al.| 379/68   |
| 7,412,489 | B2 | * | 8/2008  | Nowacki et al.  | 709/206  |
| 7,426,541 | B2 |   | 9/2008  | McCown          |          |

(Continued)

OTHER PUBLICATIONS

Microsoft; "Exchange Server 2003 Service Pack 1"; www.microsoft.com; May 25, 2004; http://www.microsoft.com/downloads/details.aspx?FamilyId=42656083-784D-4E7E-B032-2CB6433BEC00&displaylang=en; Retrieved Mar. 5, 2008; pp. 1-3.*

(Continued)

Primary Examiner—Andrew Caldwell
Assistant Examiner—Jeffrey Nickerson
(74) Attorney, Agent, or Firm—Workman Nydegger

(57) ABSTRACT

Journaling e-mail messages, containing information about an e-mail message and/or entities associated with the e-mail messages, are sent to journaling mailboxes. An e-mail server sends an original journaling e-mail message, preferably through an envelope protocol extension, to an entity's journaling mailbox. Upon detecting additional recipients of the e-mail message (e.g. an expansion of a distribution list or alternate recipient forwarding rule) the e-mail server sends an additional journaling e-mail message, containing information about the additional recipients, to the entity's journaling mailbox.

14 Claims, 8 Drawing Sheets

U.S. PATENT DOCUMENTS

| | | | |
|---|---|---|---|
| 2002/0103873 A1* | 8/2002 | Ramanathan et al. | 709/206 |
| 2002/0122543 A1* | 9/2002 | Rowen | 379/93.01 |
| 2002/0123999 A1* | 9/2002 | Bankert et al. | 707/10 |
| 2002/0129108 A1* | 9/2002 | Sykes, Jr. | 709/206 |
| 2003/0158905 A1* | 8/2003 | Petry et al. | 709/206 |
| 2004/0025057 A1* | 2/2004 | Cook | 713/201 |
| 2004/0059789 A1* | 3/2004 | Shum | 709/206 |
| 2004/0133645 A1* | 7/2004 | Massanelli et al. | 709/206 |
| 2004/0158612 A1* | 8/2004 | Concannon | 709/206 |
| 2004/0221048 A1* | 11/2004 | Ogier | 709/229 |
| 2004/0254988 A1* | 12/2004 | Rodriguez | 709/206 |
| 2004/0255160 A1 | 12/2004 | Stamos | |
| 2005/0010820 A1* | 1/2005 | Jacobson | 713/201 |
| 2005/0021963 A1* | 1/2005 | Tomkow | 713/171 |
| 2005/0027862 A1 | 2/2005 | Nguyen | |
| 2005/0108435 A1* | 5/2005 | Nowacki et al. | 709/246 |
| 2006/0053200 A1* | 3/2006 | McCown | 709/206 |
| 2006/0168003 A1* | 7/2006 | Vau et al. | 709/206 |

OTHER PUBLICATIONS

Exchange Server Documentation Team; "Journaling with Microsoft Exchange Server2003"; Dec. 12, 2006; Microsoft Corporation; pp. 1-33.*

Tulisalo et al; "Upgrading to Lotus Notes and Domino 5"; IBM; pp. 1-582.*

Codestore; "Lotus Domino Administrator 6 Help"; Jul. 10, 2006; www.codestone.net; various extracted webpages; pp. 1-9; retrieved Sep. 19, 2008; http://www.codestore.net/help/help6_admin.nsf/Main?OpenFrameSet.*

IBM; "IBM Technote (FAQ): Limits on Nesting Groups in Domino 6"; www.IBM.com; pp. 1-2; retrieved Sep. 22, 2008; http://www-01.ibm.com/support/docview.wss?uid=swg21091250.*

Racke et al; "Integration of Group Communication into CCITT X.400 Message Handling Systems"; 1986; Lecture Notes in Computer Science, vol. 248, Proceedings of the International Seminar on Networking in Open Systems; pp. 117-127.*

Microsoft Corporation; "How to Configure Envelope Journaling for Microsoft Exchange Server 2000 and 2003 to Work with Microsoft Exchange Hosted Archive or Hosted Continuty Services"; 2007; Microsoft Corporation; p. 1-13.

Office Action dated Feb. 15, 2008 cited in related U.S. Appl. No. 10/945,058.

Office Action dated Jun. 30, 2008 cited in related U.S. Appl. No. 10/945,058.

Microsoft; "KB246284: 'XADM: Set Alternate Delivery Location for Recipient Through Exchange Administrator Program'", www.microsoft.com; pp1; http://support.microsoft.com/kb/246284.

Office Action dated Sep. 30, 2008 cited in U.S. Appl. No. 10/945,058

* cited by examiner

METHODS FOR SENDING ADDITIONAL JOURNALING E-MAIL MESSAGES SUBSEQUENT TO SENDING ORIGINAL JOURNALING E-MAIL MESSAGES

CROSS-REFERENCE TO RELATED APPLICATIONS

This application is a continuation of prior application Ser. No. 10/945,058, filed Sep. 20, 2004, which is incorporated herein by reference.

BACKGROUND OF THE INVENTION

1. The Field of the Invention

The invention generally relates to journaling e-mail messages. More specifically, the invention relates to journaling envelope information from e-mail messages.

2. Description of the Related Art

To comply with various legal regulations, corporate record-keeping, information tracking, legal discovery requests and the like, it may be desirable to archive e-mail information. In fact, various financial, health and security regulations require archiving communications within the organization. Such regulations include for example, the Sarbanes-Oxley Act, SEC rule 17A-4, NASD 3110 and 3111, the Gramm-Leach-Bliley Act, The Health-Care and Insurance Portability and Accountability Act Of 1996, The Uniting and Strengthening America by Providing Appropriate Tools Required to Intercept and Obstruct Terrorism Act Of 2001, etc.

One category of e-mail archiving is known as e-mail journaling. Journaling allows organizations to record e-mail communications within an organization. An e-mail journaling system should be able to readily provide certain information. For example, the system should be able to provide information about who received copies of a given message. The journaling system should be able to provide information about what messages a given sender sent in a given time period and who received those messages. A journaling system should be able to provide information about what messages were received by a given recipient in a given time period and who sent those messages.

Thus, e-mail journaling ideally records several different types of information. One type of information is the content in the body of an e-mail message. This information includes the message that is sent or the textual communication between a sender and the recipient. The content of an e-mail message, for example, including a message header, may further include a message id which is a unique serial number that specifically identifies a particular e-mail message. Other types of content may include information in the to:, from:, cc (carbon copy):, and bcc (blind carbon copy): fields. The content in these fields, (e.g., in message headers) identify the sender and who the sender discloses as recipients of the e-mail message. An e-mail message, for various reasons, may not reach all of the recipients identified by the sender, or may reach other recipients not specifically identified by the sender.

An e-mail envelope may be used by a sending server to determine where a particular e-mail message should be sent. The e-mail envelope contains the sender and intended recipients of the e-mail message. This information is used to route messages in a topology for delivery to an appropriate e-mail box. Envelope information may change as an e-mail message is routed through a topology. For example, when a distribution list is expanded, actual e-mail addresses designated by the distribution list may be added to the envelope. The envelope is typically discarded once an e-mail message is received.

A number of different methods have been used to accomplish e-mail journaling. For example, one system caused a message to be delivered to a mailbox established for maintaining an e-mail journal by placing the e-mail address of the mailbox for the e-mail journal in a bcc field. This method has drawbacks in that various actual recipients may be left off of the message delivered to the journaling mailbox. For example, this method does not allow recipients that received an e-mail through a bcc field address or recipients added as a result of expansion of a distribution list to be recorded as having received a particular e-mail. Additionally, recipients that may not have actually received the e-mail message may appear in the e-mail message delivered to the mailbox for the e-mail journal. As mentioned previously, the recipients specified in the to: and cc: fields are the recipients specified by a sender and may not be actual recipients who received the e-mail message.

Additionally, if an e-mail specifies a distribution list in the to:, cc:, or bcc fields, the distribution list may not accurately reflect the actual recipients who received the e-mail. Distribution lists present a particular problem in that by their very nature they change over time. Members of a distribution list at one period of time may not be the same members of the distribution list at a different period of time due to changes in corporate structure, personnel changes, and the like. Another method of e-mail journaling is accomplished by maintaining an e-mail mailbox similar to an outbox which stores messages and envelope information sent by a particular user. This method, however, does not solve the problem of identifying recipients that received an e-mail message by virtue of their membership in a distribution list. What would therefore be advantageous is a journaling system that is able to journal envelope information including a best effort to identify specific recipients.

BRIEF SUMMARY OF THE INVENTION

The foregoing problems with the prior state of the art are overcome by the principles of the present invention, which are directed towards methods, systems, data structures, and computer program products for envelope e-mail journaling with best effort recipient updates. In some embodiments, a server sends a journal message for journaling an e-mail message. The server determines that envelope journaling is enabled for the particular entity and a journaling mailbox address is specified. An entity can be a sender or recipient (e.g., a direct recipient, a carbon copy recipient, or a blind carbon copy recipient) of the e-mail. Recipients can be identified by expanding distribution lists.

The server sets a journaling property in the e-mail message that identifies the e-mail message as a message to be journaled. The server adds the journaling mailbox address specified to the journaling property. The server sends an envelope journaling report to the journaling mailbox addresses specified in the journaling property. The server sends the e-mail message to one or more recipients specified in the e-mail message and any journaling mailbox addresses specified in the journaling property.

The journaling property is also transmitted along with the e-mail message, so that the other servers who process the e-mail message know from the journaling property that this message has been journaled to the mailboxes contained in the journaling property. Other servers do not create additional journal messages unless new recipients are added. New recipients may be added because of a distribution list expansion, forwarding rules, or for other reasons. Additionally, a property may be added to the journaling e-mail messages to identify them as journal e-mail messages. Journaling need not be done for the journal e-mail messages themselves.

In other embodiments, a journaling server journals an e-mail message. The journaling server receives envelope journaling information including sender information, recipient information, and message identification information. The journaling server receives a message portion of an e-mail message. The journaling server creates a journal archive message. The journaling server places the sender information, the recipient information, and message identification information in the body of the journal archive message. The journaling server attaches at least a portion of the message portion of the e-mail message as an attachment to the journal archive message.

Other embodiments include an e-mail server sending an e-mail message from a sender to one or more recipients. The email server further sends a journaling e-mail message to a journal mailbox store address specified for journaling messages to and from the sender. The journaling e-mail message includes a report listing the recipients. The e-mail server, or another e-mail server in a topology, detects one or more additional recipients of the e-mail message and sends an additional journaling e-mail message including an additional report listing at least one of the additional recipients to the journal mailbox store specified for journaling messages to and from the sender. The additional journaling e-mail message includes an additional report listing the additional recipients.

Another embodiment includes an aggregation server receiving a number of journal archive messages. Each of the journal archive messages includes a report having at least one of sender information, recipient information and a unique identifier. One or more of the journal archive messages further include at least a portion of an e-mail message. One or more journal archive messages that include at least a portion of the e-mail message are sent for the purpose of journaling the e-mail message. The aggregation server aggregates the journaling e-mail messages based on the characteristics of the reports included in the journal archive messages. For example, the journal archive messages may be aggregated for compliance with specified policies, such as, for example, the Sarbanes-Oxley Act, SEC rule 17A-4, NASD 3110 and 3111, the Gramm-Leach-Bliley Act, The Health-Care and Insurance Portability and Accountability Act Of 1996, The Uniting and Strengthening America by Providing Appropriate Tools Required to Intercept and Obstruct Terrorism Act Of 2001, etc.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
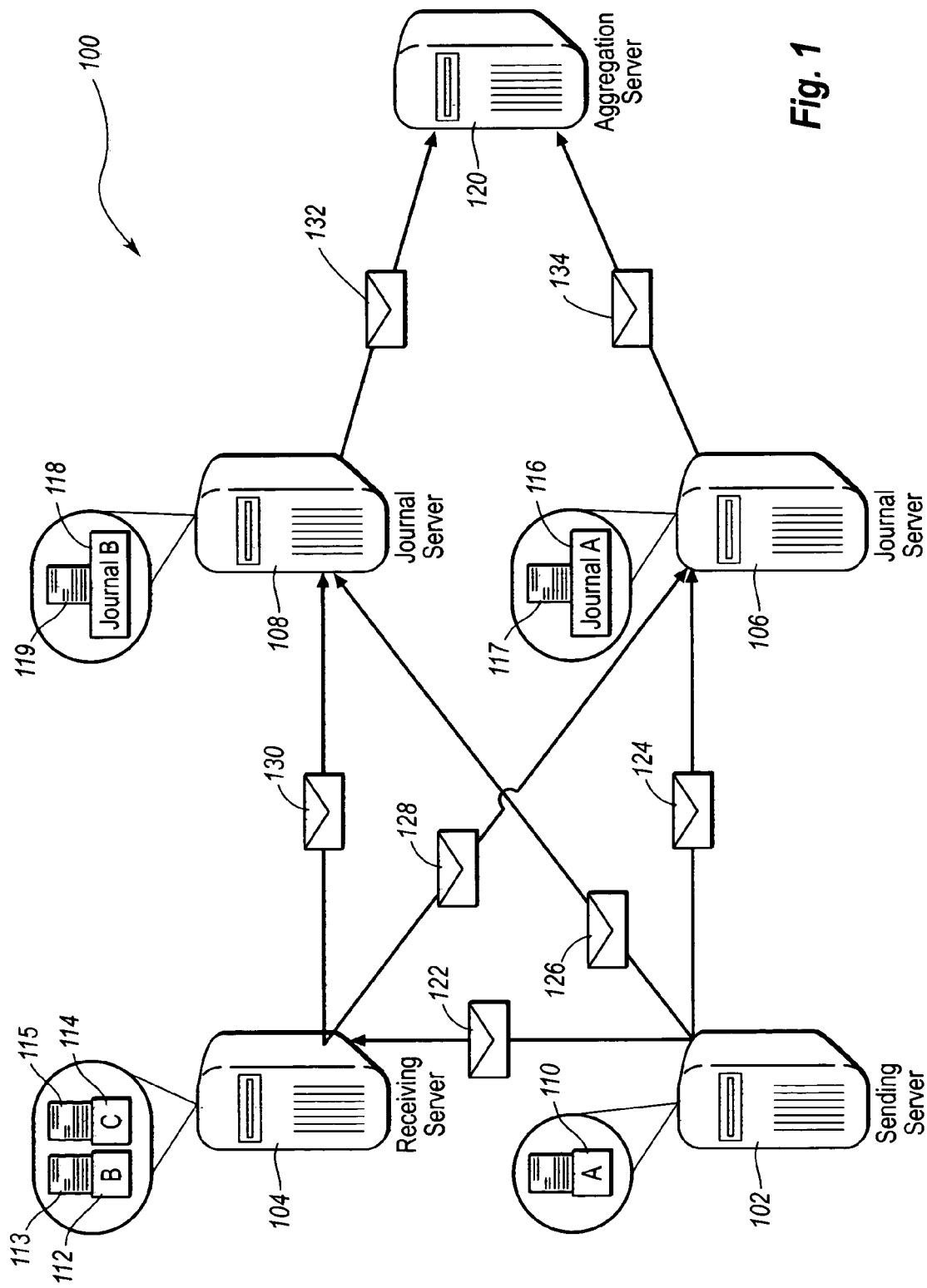
FIG. 1 illustrates an e-mail server topology.

The principles of the present invention provide for envelope e-mail journaling with best effort recipient updates. In some embodiments, a server sends a journal message for journaling an e-mail message. The server determines that an entity's home mailbox store has envelope journaling enabled for the specific entity and specifies a journaling mailbox address. Envelope journaling may be enabled by a property being set in a home mailbox store or by any other appropriate way. An entity can be a sender or recipient (e.g., a direct recipient, a carbon copy recipient, or a blind carbon copy recipient) of the e-mail. Recipients can be identified by expanding distribution lists.

The server sets a journaling property in the e-mail message that identifies the e-mail message as a message to be journaled. The server adds the journaling mailbox address specified by the entity's home mailbox store to the journaling property. The server sends envelope journaling information in one embodiment through an extension of an envelope protocol to the journaling mailbox addresses specified in the journaling property. The server sends the e-mail message to one or more recipients specified in the e-mail message and any journaling mailbox addresses specified in the journaling property.

The journaling property is also transmitted along with the e-mail message, so that the other servers who process the e-mail message know from the journaling property that this message has been journaled to the mailboxes contained in the journaling property. Other servers do not create additional journal messages unless new recipients are added. New recipients may be added because of a distribution list expansion, forwarding rules, or for other reasons. Additionally, a property may be added to the journaling e-mail messages to identify them as journal e-mail messages. Journaling need not be done for the journal e-mail messages themselves.

In other embodiments, a journaling server journals an e-mail message. The journaling server receives envelope journaling information including sender information, recipient information, and message identification information through, in one embodiment, an extension of an envelope protocol. The journaling server receives a message portion of an e-mail message. The journaling server creates a journal archive message. The journaling server places the sender information, the recipient information, and message identification information in the body of the journal archive message. The journaling server attaches at least a portion of the message portion of the e-mail message as an attachment to the journal archive message.

Other embodiments include an e-mail server sending an e-mail message from a sender to one or more recipients. The email server further sends a journaling e-mail message to a journal mailbox store address specified for journaling messages to and from the sender. The journaling e-mail message includes a report listing the recipients. The e-mail server, or another e-mail server in a topology, detects one or more additional recipients of the e-mail message and sends an additional journaling e-mail message including an additional report listing at least one of the additional recipients to the journal mailbox store specified for journaling messages to and from the sender. The additional journaling e-mail message includes an additional report listing the additional recipients.

Another embodiment includes an aggregation server receiving a number of journal archive messages. Each of the journal archive messages includes a report having at least one of sender information, recipient information and a unique identifier. One or more of the journal archive messages further include at least a portion of an e-mail message. One or more journal archive messages that include at least a portion of the e-mail message are sent for the purpose of journaling the e-mail message. The aggregation server aggregates the journaling e-mail messages based on the characteristics of the reports included in the journal archive messages. For example, the journal archive messages may be aggregated for compliance with specified policies, such as for example, the Sarbanes-Oxley Act, SEC rule 17A-4, NASD 3110 and 3111, the Gramm-Leach-Bliley Act, The Health-Care and Insurance Portability and Accountability Act Of 1996, The Uniting and Strengthening America by Providing Appropriate Tools Required to Intercept and Obstruct Terrorism Act Of 2001, etc.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention extends to methods, systems, and computer program products for journaling e-mail messages including journaling envelope transport information such as information indicative of the sender, recipient and a unique message identifier. Some embodiments of the present invention may comprise one or more special purpose and/or one or more general purpose computers including various computer hardware, as discussed in greater detail below. Referring now to FIG. 1 various aspects are described with reference to the network topology 100 shown. The network topology 100 includes a number of e-mail servers that are configured to transfer and/or receive e-mail messages including a message and an envelope.

For purposes of this illustration the servers have been labeled sending server 102, receiving server 104, journal server 106, and journal server 108. These labels are for descriptive purposes to differentiate the servers and to illustrate various principles of the present invention in conjunction with functional examples described with respect to FIG. 1. However, it would be apparent to one skilled in the art, after having reviewed this description, that each of the servers may be able to send and receive e-mail messages and journaling information, as well as storing journal messages, irrespective of their labels in FIG. 1. The functionality of one or more servers may be combined on a single server. For example, the acts described below as being performed by the receiving server 104 could also be performed with the acts performed by the sending server 102. The functionality of the journal server 106 may be performed by the sending server 102 or receiving server 104. Other topologies may also exist.

In one functional example, a user A with a mailbox store 110 on the sending server 102 desires to send a message to a user B and members of a distribution list. User B has a mailbox store 112 on the receiving server 104. The receiving server 104, in this example, is also the server designated to expand the distribution list specified by the user A. In this example, the distribution list has a single member; user C. User C has a mailbox store 114 on the receiving server 104.

As depicted, journal archive messages are stored in the journal servers 106, 108. The journal server 106 maintains a journal mailbox store 116 to journal user A's sent and received messages as journal archive messages 117. Similarly, the journal server 108 contains a journal mailbox store 118 to journal user B's sent and received messages as journal archive messages 119. While not shown here, an additional server may be used to archive user C's (or other members in a distribution list) sent and received messages when user C has journaling enabled. Alternatively, if user B and C share a mailbox store, such as mailbox store 112, journal server 108 and journal mailbox store 118 may be used to journal user B and user C's messages. In yet another alternative embodiment, user C's mailbox store 114 may specify an address of journal mailbox store 118 in which case journal mailbox store 118 would store journal archive messages 119 for both user B and user C. Embodiments allow for a journal mailbox address in a journal mailbox store to be specified for an entity. Thus, a single journal mailbox address may be specified for one or more, or even all entities.

An aggregation server 120 may be used to collect messages stored in the journal mailbox stores within a topology such as journal mailbox store 116 and journal mailbox store 118. The aggregation server 120 may receive the messages stored in the journal mailbox stores 116, 118 by either the messages being pushed from the journal servers 106, 108 or by the messages being pulled by the aggregation server 120. For example, to push from the journal servers 106, 108, the journal servers may include a server side rule that forwards journal archive messages 117, 119 to the aggregation server 120 through SMTP. Pulling may be accomplished using for example POP3, IMAP4 and the like requests from the aggregation server 120.

The aggregation server 120 has functionality to aggregate message for appropriate reporting. For example, the aggregation server 120 may receive messages 132 and 134 which, as discussed below, contain a journal report listing information such as a sender, recipients, a unique identifier and the like. The messages may also have an attachment that includes at least a portion of the original e-mail message 122. These messages may then be aggregated such as in one example by creating a single journal report listing the sender and all recipients with the attachment that includes at least a portion of the original e-mail message. Other embodiments allow for journal archive messages that result from the same original message to be grouped together. In this way, messages can be searched or filtered to gather appropriate information for an entity such as information regarding what messages were sent and received for an entity In one embodiment, journal reports can be formatted to ease compliance with policies or regulations. For example, journal reports at the aggregation server 120 may be formatted to ease reporting information in compliance with regulations such as the Sarbanes-Oxley Act, SEC rule 17A-4, NASD 3110 and 3111, the Gramm-Leach-Bliley Act, The Health-Care and Insurance Portability and Accountability Act Of 1996, The Uniting and Strengthening America by Providing Appropriate Tools Required to Intercept and Obstruct Terrorism Act Of 2001, etc.

In the journaling example shown in FIG. 1, the network topology 100 is able to archive journal messages in such a way that information identifying the sender of an e-mail and all recipients may be archived. This form of journaling may be referred to herein as envelope journaling. Envelope journaling can include information ordinarily contained in the envelope(s) of an e-mail message as the e-mail message passes through one or more e-mail transports to reach the intended recipients.

As will be described in the embodiment shown in FIG. 2, envelopes are not typically delivered to a mailbox store, such as stores 112 and 114, rather the envelopes are used to route messages 113 and 115 which are delivered to the mailbox stores 112 and 114. However, embodiments allow information used by envelopes to be included in messages, such as messages 117 and 119, delivered to journal mailbox stores, such as journal mailbox stores 116 and 118.

For example, envelope journaling allows for the archiving of information identifying specific recipients as they are added to envelope information when an e-mail passes through the one or more e-mail transports. This is in contrast to previous journaling systems where a journaled message may include information identifying the sender and the recipient specified by the sender whether or not those specified recipients actually receive a message. As discussed previously herein, the sender will often specify a distribution list or blind carbon copy recipients. In the example of a distribution list, embodiments are able to archive information identifying specific recipients in the distribution list even when this information was not available to and/or included by the original sender.

Embodiments allow a mailbox store to be configured for envelope journaling. Specifically, the mailbox store, such as mailbox stores 110, 112 and 114, may include a user configured or network administrator configured property that indicates that the mailbox store is enabled for envelope journaling. Envelope journaling may be enabled on a per-entity basis or on a per mailbox store basis. When envelope journaling is enabled on a per mailbox store basis, every entity with an e-mail mailbox at the mailbox store has envelope journaling enabled.

In the example shown in FIG. 1, at least mailbox store 110 and a mailbox store 112 are configured for envelope journaling. The property that specifies that a mailbox store is configured for journaling is done, in this example, on a per mailbox store basis. Thus, if users share a mailbox store with envelope journaling enabled any messages to or from all users sharing the mailbox store will be envelope journaled.

Illustrating now a functional example of sending e-mail messages and envelope journaling, user A of mailbox store 110 may desire to send a message to user B at mailbox store 112 and a distribution list that includes users C at mailbox store 114. The sending server 102 reads a property on mailbox store 110 that indicates that messages sent and received from and by mailbox store 110 are to be journaled. The sending server 102 further is able to determine that messages to and from mailbox store 112 are to be journaled. Thus, the sending server sends an e-mail message 122 to the receiving server 104 where a message 113 including the message of e-mail message 122 is delivered to user B at mailbox store 112.

Additionally, the sending server forwards e-mail messages 124, 126 for journaling to journaling servers 106, 108 where journal mailbox stores 116 and 118 are located for storing journal archive messages for users A and user B respectively. The receiving server 104 expands the distribution list in the e-mail message 122. Expansion of the distribution list reveals that a user C at mailbox store 114 should also receive the message in the e-mail message 122. To ensure that the journal mailbox stores 116, 118 for users A and B properly reflect all senders and recipients, a journal e-mail message 128 is sent from the receiving server 104 to the journal server 106 and a journal e-mail message 130 is sent from the receiving server 104 to the journal server 108.

These journal e-mail messages 128, 130 include an indication that the message from the e-mail message 122 was delivered to user C from the distribution list at mailbox store 114. Messages 117 and 119 that indicate that user C received a message 115 from the original e-mail message 122 can then be stored in the journal mailbox stores 116, 118 for users A and B respectively.

The aggregation server 120, as mentioned previously, may receive journal archive messages, such as messages 117 and 119. A unique message identifier associated with the original e-mail message 122 is included in the journal archive messages 117 and 119 and can be used to group all journal archive messages that result from e-mail message 122 being sent. This group of journal archive messages can then be searched to discover the sender, the actual recipients of an e-mail message, recipients who were to receive a message but did not (such as by using journaled undeliverable messages) and other appropriate information.

Figure 2:
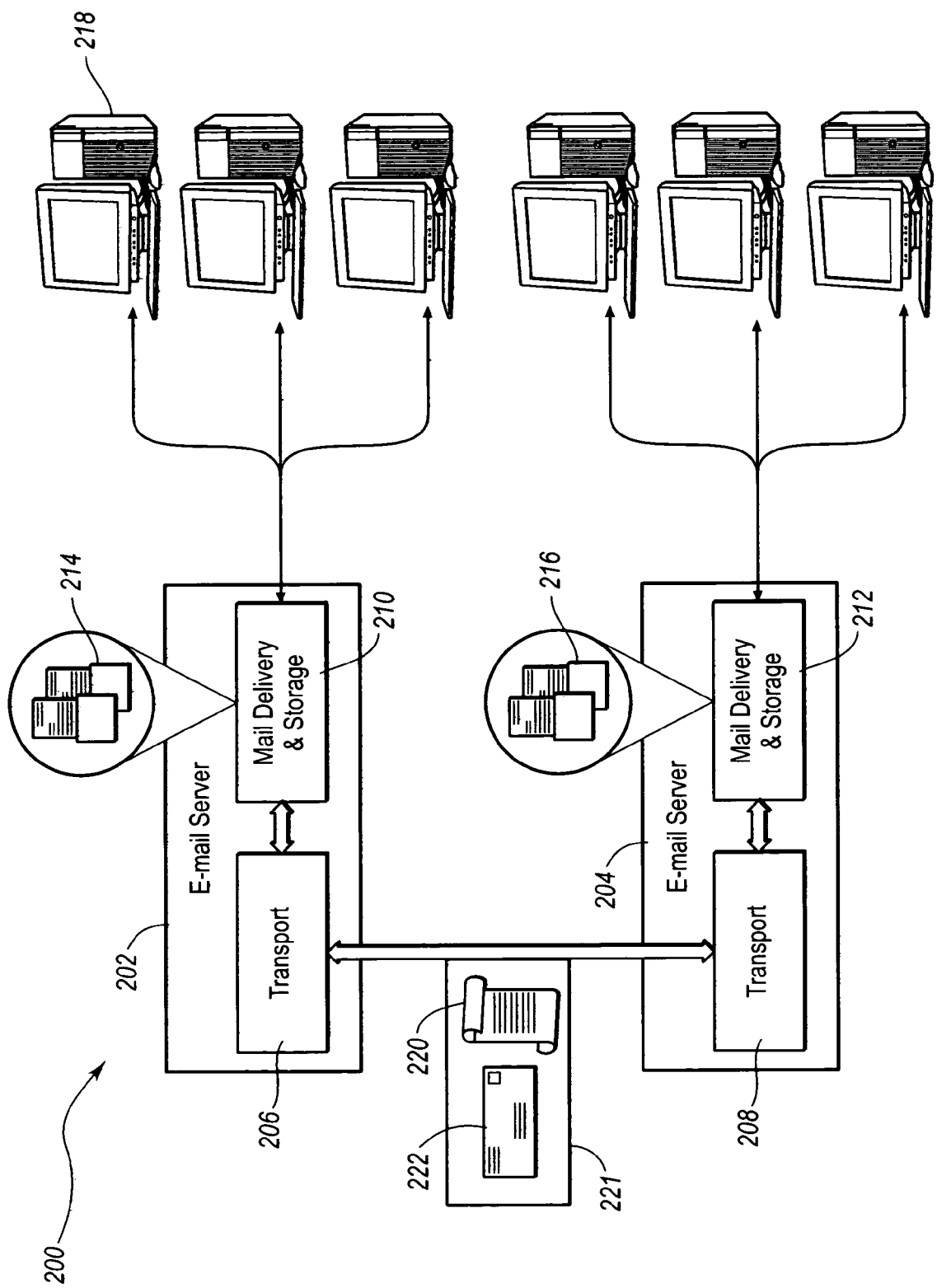
FIG. 2 illustrates a detailed topology illustrating interaction between e-mail servers.

Referring now to FIG. 2, a topology 200 illustrates the interconnection of two e-mail servers 202 and 204. In one embodiment, e-mail servers such as e-mail servers 202 and 204 may include transports 206, 208 and mail delivery and storage 210, 212. The transports 206, 208 may be implemented as software modules and are used to communicate between e-mail servers 202, 204. The mail delivery and storage 210, 212 include mailbox stores 214, 216. The mail delivery and storage 210, 212 may be connected to personal computers 218 where users may send and receive e-mail. The users at the personal computers 218 are able to access the mailbox stores 214, 216 to view messages in the mailbox stores 214, 216.

In one illustrative example a user at a personal computer 218 may desire to send a message to one or more other users at other personal computers 218. As mentioned in conjunction with the description of FIG. 1, the user may address the e-mail message 221 to a specific e-mail address or to a distribution list that may be expanded by an e-mail server to reveal a number of e-mail addresses.

Messages 220 sent between e-mail servers 202, 204, or even within the same e-mail server such as when a sender and recipient have mailbox stores on the same e-mail server, are generally packaged with an envelope 222 to form an e-mail message 221. The envelope 222 may include information such as information identifying a sender, information identifying recipients, server routing information and a unique message identification that is associated with the message 220. The information identifying a sender, when first sent from a sending server will generally be the e-mail address of the sender. Information identifying receivers may take various forms. For example, the information may be an e-mail address or a distribution list.

An envelope 222 may also be part of a protocol that includes an extension such that other information may be sent using the envelope when it is not desirable to send information in the body of a message. For example, XEXCH50, described in U.S. Pat. No. 6,035,327, incorporated herein by reference, is an example of an extension that allows for sending and receiving additional information as part of the envelope. As will be described subsequently herein, an extension to an envelope protocol can be used to send information between e-mail servers 202, 204 to accomplish effective envelope journaling. Envelope journaling information may be transmitted in other ways as well. For example, envelope journaling information may be transmitted as part of a header included in the body of a journal message. Other protocols or functionality may be used to send envelope journaling information alternatively or in addition to the protocols and functionality described herein.

The present invention also may be described in terms of methods comprising functional steps and/or non-functional acts. The following is a description of acts and steps that may be performed in practicing some embodiments. Functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 3:
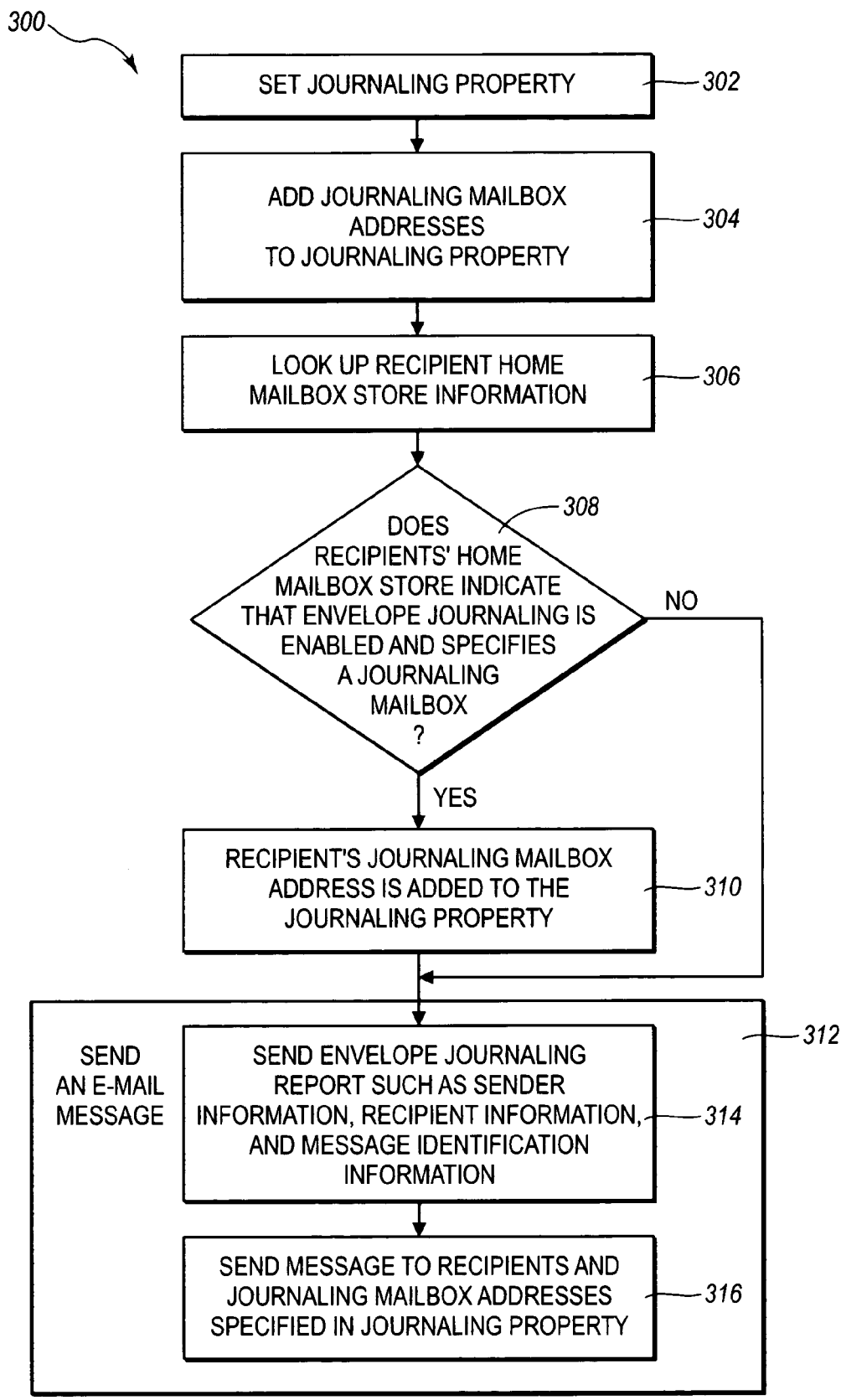
FIG. 3 illustrates a method for sending envelope journal e-mail messages.

A method 300 is illustrated in FIG. 3, which shows a flow diagram, which shows acts that may be used by one embodiment of the invention. FIG. 3 will be discussed in conjunction with FIGS. 1 and 2. Method 300 illustrates various acts that may be performed by a sending server such as the sending server 102 shown in FIG. 1. While FIG. 3, in this example, is specific to a sending server, it should be understood that the acts described in FIG. 3 may be performed by any one of a number of servers in topologies 100 and 200. Further, while specific entities are referred to, other entities may be substituted. For example, when reference is made to a sender's mailbox store, other embodiments may substitute another entity, such as a recipient, cc recipient, bcc recipient, distribution list recipient and the like.

Method 300 can include an act of determining that an entity's home mailbox store has envelope journaling enabled, either on a per entity basis or on a per mailbox basis, and specifies a journaling mailbox address. For example, a sender's mailbox store such as mailbox store 110 can indicate that messages to and from an entity should be envelope journaled and can specify a journaling mailbox address. Other embodiments allow for the specification that envelope journaling is enabled to be performed in other suitable ways.

Thus when user A sends a message, the sending server 102 will set a journaling property (act 302) in the e-mail message 122. This journaling property indicates that this is a message that will be envelope journaled. Any suitable indication that an e-mail message is to be envelope journaled may be used as a journaling property. As used herein, journaling property does not refer to any specific property of any specific product or implementation but is rather a general description. The journaling property will travel with the message through an e-mail server topology such as topology 100.

The sending server 102 may add a list of journal mailbox addresses to the journaling property (act 304). A journaling property as used herein does not require that the indication that an e-mail message is to be envelope journaled and an enumeration of journal mailbox addresses be stored with any sort of proximity to each other. For example, the indication and enumeration of journal mailbox can be specified in a user configurable or network administrator configurable property of the sender's home mailbox store such as mailbox store 110.

Determining that an entity's home mailbox store has envelope journaling enabled and specifies a journaling mailbox address can also include the sending server 102 looking up recipient address information (act 306). For example, the sending server 102 may consult an active directory to look up e-mail addresses for recipients specified by a user sending a message from mailbox store 110. Looking up recipient address information (act 306) allows the sending server 102 to discover if a recipient's home mailbox store, such as store 112 or mailbox store 114, includes a property indicating that envelope journaling is enabled and specifies a journaling mailbox address (act 308).

When the sending server 102 determines that a recipient's home mailbox store includes a property indicating that envelope journaling is enabled and specifies a journaling mailbox address (act 308), then the sending server 102 adds the journaling mailbox address specified by each recipient mailbox store to the journaling property (act 310).

The sending server 102 then sends e-mail messages 122, 124, 126, including an envelope and message, to recipients specified in the e-mail message and any journaling mailbox address specified in the journaling property (step 312). In FIG. 1 an example of this is shown as sending server 102 sends a message to receiving server 104 for delivery to mailbox store 112 for user B. The sending server 102 further recognizes from the journaling property of the e-mail message 122 that journaling e-mail messages 124 and 126 should be sent to journal servers 106 and 108 such that journal archive messages may be delivered to and stored in the journal mailbox stores 116 and 118.

Examples of sending e-mail messages between servers is illustrated in FIG. 2 where a message 220 passes from a mail delivery and storage 210 in a first e-mail server 202 to the transport 206 to transport 208 on another e-mail server 204 into a mail delivery and storage 212 where the message can be delivered to a mailbox store 216. The mailbox store 216 in this example may either be a mailbox store for a user recipient address specified in the e-mail recipient address or a journaling mailbox address store. If the mailbox store 216 is a journaling mailbox store, the message delivered to the journaling mailbox store, as discussed below in more detail, includes information identifying the original sender, at least a portion of the recipients, and a unique message identifier.

As part of the process of sending an e-mail message 221 to recipients and journaling mailbox addresses (step 312), the sending server 102 sends an envelope 222, including envelope information, to the recipients and journal servers 106, 108 (FIG. 1). Envelope information usually includes parameters specifying the sender of a message, the intended recipient of a message, and a unique message identifier for the message 220. This information is used to correctly route the message 220 through a network topology 100 (FIG. 1) so that the message reaches the intended recipients.

Information in the envelope 222 often times may not include the actual first sender of a message 220 or all of the recipients of a message 220 as specified in the journaling property. For example, if a message 220, while traveling through a network topology 100 (FIG. 1), passes through an intermediate server that expands a distribution list specified by the sender of the message 220, the intermediate server may remove sender information and may add specific recipient e-mail addresses. Thus as an e-mail message 221 passes through various servers in a topology 100 (FIG. 1), information typically contained in the envelope 222 may be altered.

Thus in one embodiment of the invention, when messages are sent to a journaling mailbox store, an extended envelope protocol is used which includes the ability to send with the e-mail message additional data, such as an envelope journaling report, in the envelope including information that was in the envelope of the original e-mail message 122. Thus the sending server 102 may send an envelope journaling report through the envelope. The envelope journaling report can include, for example, information identifying the original sender, information identifying known recipients as set forth in the journaling property, and a message identifier that can be used to identify the original message (act 314). As discussed previously, journaling information may be sent in other suitable ways as well, including but not limited to as fields in a header of an e-mail message.

A further part of sending an e-mail message 221 to recipients and journaling mailbox addresses (step 312) includes sending a message to recipients and journaling mailbox addresses specified in the journaling property (act 316). For example, referring to FIG. 2, a message 220 may be routed from a server 202 to another server 204 where the message 220 may be routed to an appropriate mailbox store 216.

While not illustrated in FIG. 3, the method 300 may further include an act of indicating in the journaling property that envelope journaling information is to be sent to journaling mailbox addresses specified in the journaling property. This allows servers that subsequently receive the e-mail message with the journaling property to discover which journaling mailbox addresses have already received a journaling report that includes the present list of recipients. By knowing what journaling mailbox addresses have already received the journaling report, a duplicate message to the same journaling mailbox address can be avoided.

Figure 4:
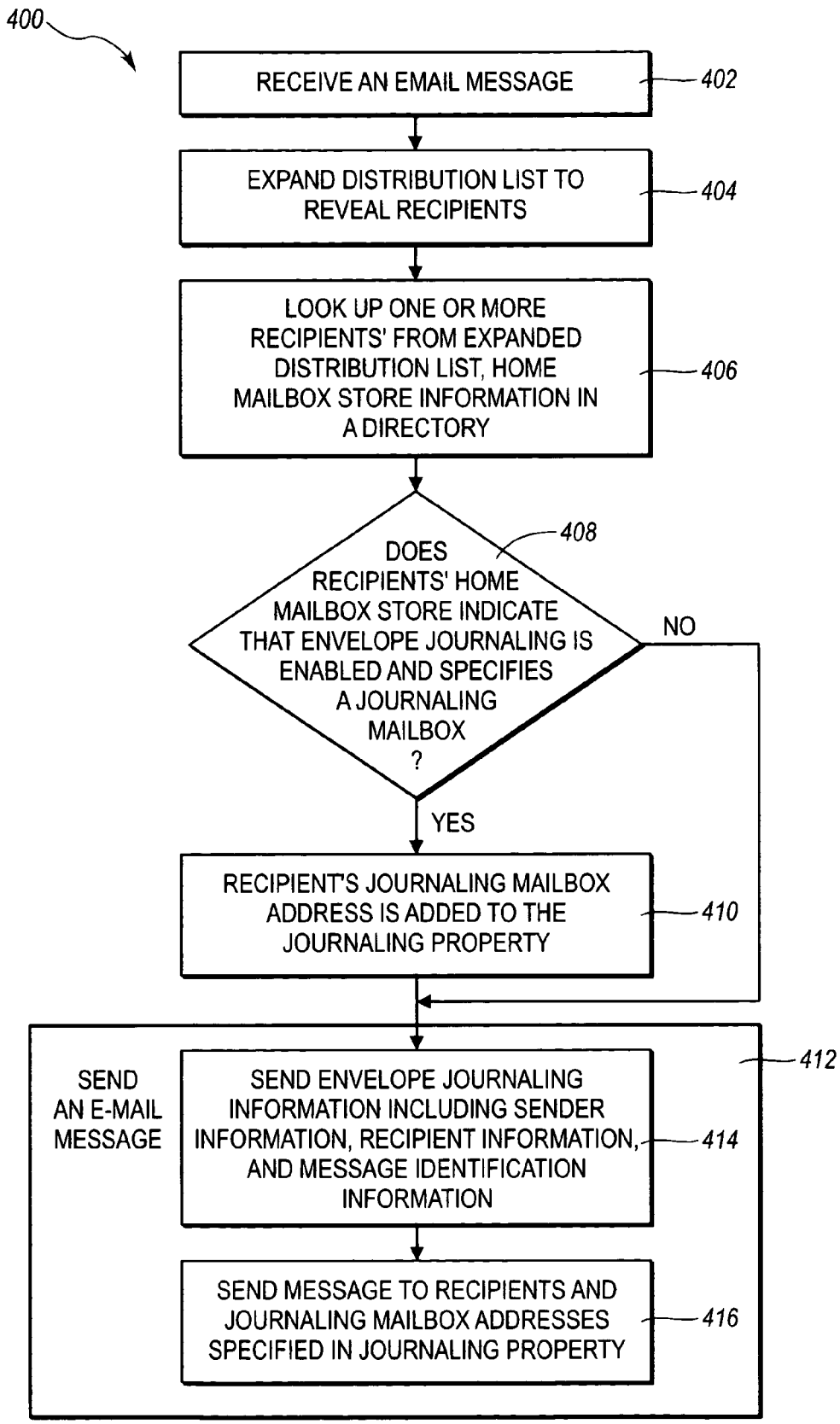
FIG. 4 illustrates a method for sending envelope journal e-mail messages.

Another method 400 is illustrated in FIG. 4, by a flow chart, which illustrates various acts performed by a receiving server. The method 400 described in FIG. 4 will also be explained using FIGS. 1 and 2. A receiving server receives an e-mail message (act 402). For example, referring to FIG. 1, the receiving server 104 may receive a message from the sending server 102 such as message 122. The message 122 may be addressed to specific e-mail addresses and/or distribution lists. If the message 122 is intended for only a specific e-mail address, the receiving server 104 can examine a journaling property of the e-mail message 122 to determine that the sending server 102 has appropriately sent journaling e-mail messages 124, 126 to journal servers 106, 108 which include the journal mailbox stores 116, 118.

Method 400 can include an act of determining, in one embodiment, that an entity's home mailbox store has envelope journaling enabled and specifies a journaling mailbox address. An entity, as discussed previously, may have envelope journaling specified just for the entity in some embodiments. If a message includes a distribution list, and a receiving server is the server designated to expand the distribution list, the receiving server expands the distribution list to reveal recipients e-mail addresses in the distribution list (act 404). For example, in FIG. 1, this allows a message that is a part of e-mail message 122 to be delivered to an appropriate mailbox store such as mailbox store 114 and/or to be forwarded to another server with a mailbox store for recipients from the expanded distribution list. In this example, expansion of the distribution list (act 404) reveals that user C should also receive the message associated with e-mail message 122. Thus user C is added as an additional recipient to the e-mail message. User C's e-mail address is typically added to the envelope of an e-mail message.

Additional recipients may be added to an e-mail message in other ways as well. For example a recipient may be added when a server invokes an alternate recipient forwarding rule.

The receiving server looks up one or more recipients from the expanded distribution lists home mailbox store information in a directory (act 406). For example, in FIG. 1, the home mailbox store 114 for user C may include information including a property that indicates that envelope journaling is enabled for the particular mailbox store 114 associated with user C's e-mail address. The home mailbox store information may further include a journaling mailbox address for the particular home mailbox store.

For example, as shown in FIG. 1, the mailbox store 114 which stores messages for users C may include a property that indicates that journal archive messages are to be stored in the journal mailbox store 118. Notably, in one embodiment of the invention, the inclusion of a journaling mailbox address serves both the purpose of indicating that envelope journaling is enabled and specifying a journaling mailbox address. This information may be stored in a central directory within the topology 100.

The method 400 then checks to see if a recipient's home mailbox store indicates that envelope journaling is enabled and if a journaling mailbox address is specified (act 408). For example, a receiving server 104 may check mailbox store 114 to see if it includes a property that specifies that journaling is enabled and a journaling mailbox is specified.

If a recipient from the expanded distribution list has a home mailbox store that indicates that envelope journaling is enabled and specifies a journaling mailbox, then the recipient's journaling mailbox address is added to the journaling property (act 410). If no journaling property is set, a journaling property is set prior to adding the recipient's journaling mailbox address is added to the journaling property (act 410). This may occur, for example, when a sending mailbox store such as mailbox store 110 is not set for envelope journaling when a recipient's mailbox store, such as mailbox store 114, is set for envelope journaling.

A receiving server, such as receiving server 104, may need to set a journaling property whether the recipients are discovered from expansion of a distribution list or from the recipient property of the original e-mail message 122 when the sending mailbox store 110 does not have envelope journaling enabled. This may occur when a sending server 102, or other servers, does not have capabilities to run the envelope journaling functions described herein. Envelope journaling may still nonetheless be accomplished, or best efforts attempted, by other capable servers in the topology.

An e-mail message is then sent to recipients and journaling mailbox addresses specified in the journaling property (step 412). For example, and referring again to FIG. 1, a message 115 may be delivered to a mailbox store 114 for use by user C. If mailbox store 114 includes a journaling attribute that indicates that envelope journaling is enabled and specifies journaling mailbox store 118 as a journaling mailbox address, an e-mail message 130 is sent to journaling server 108 to cause delivery of a journal archive message 119 to journaling mailbox store 118.

The e-mail message 130 includes the original e-mail message and an envelope. The envelope may include information that specifies a sender, one or more recipients including the journaling mailbox address, and a unique message identification for the e-mail message 130. Because the recipient user C was discovered through the expansion of the distribution list the sender information specified in the envelope may not accurately reflect that user A was the original sender of the original message 122. The method 400 therefore allows envelope journaling information including the original sender information, recipient information, and the message identification identifying the original e-mail 122 to be sent through an extended envelope protocol (act 414). As mentioned previously, other appropriate protocols and functionality may be used to send the envelope journaling information.

Recipient data is gathered and sent in an envelope journaling report as described above using the extend envelope protocol. When recipients are gathered, the sending server gathers recipient data for all known recipients that will be delivered to. This includes recipients discovered from expanding a distribution list or alternate recipient forwarding rules that may exist on a server. It further includes the distribution list itself. Preferably, the recipient information does not include recipients that will receive undeliverable notices or recipients that are removed locally from a distribution list after it has been expanded. As discussed previously, one objective of journaling is to document actual recipients of a message. By not including recipients that do not actually receive a message, such as undeliverable or removed recipients, the recipient information more accurately reflects the information desired from a journaling system.

The recipient data, however, can include recipients that are being forwarded to an SMTP virtual server configured alternate server. Recipients that are forwarded to an alternate server are those that would otherwise receive undeliverable notices due to having addresses that are not found in the directory but fall under an authoritative domain from the recipient policy configuration. Recipient addresses may be for example, (in order of preference) SMTP, X.400, X.500, Exchange DN and the like.

Sender information may be obtained in several ways. If the sender specified in an envelope is the original sender, the sender can simply be taken from the envelope information. Often the sender information is removed in the case of distribution list expansions or server forwarding rules. Thus, there may be a need to get the original sender information from information that may be sent in the extension of the envelope protocol. Sender information may be in the form of an e-mail address. Sender addresses may be for example, (in order of preference) SMTP, X.400, X.500, Exchange DN and the like.

At least a portion of a message is also sent to recipients and journaling mailbox addresses specified in the journaling property (act 416). For example, referring to FIG. 1, a message 115 is delivered to mailbox store 114 while a journal archive message 119 is delivered to journal mailbox store 118. When new recipients are added, a journal report may be sent to a journaling mailbox address specified for the sender of an e-mail message. This helps to ensure that the journal archive mailbox for the sender includes a full report of recipients of the e-mail message.

A saved journal recipient list may also be sent through the extension of the envelope protocol to the receiving server (FIG. 1). When new recipients are added to an e-mail message, the receiving server 104 may check the saved journal recipient list to detect new recipients that may necessitate further journal e-mail messages being sent. If a recipient is a top level recipient, i.e. a recipient that was originally on a message when it was categorized as an envelope journaled message, no new journal messages need to be sent. However, if the recipient is added later, such as by expansion of a distribution list and the like, there may be a need to send a journal e-mail message that includes all previous recipients including sending a journal e-mail message with a journal report to a journaling mailbox address specified for the sender of the e-mail message. In any case, when the recipient is not originally a top level recipient, the recipient will be added to the saved journal recipient list when discovered.

While the method of FIG. 4 has illustrated the functionality of the receiving server 104 when a distribution list is included, the receiving server may perform other functionality or some of the functions above without expanding a distribution list. For example, when there is no distribution list, the receiving server can check to see if the journaling property received with the e-mail message 122 indicates the messages have been sent for archiving. If mailbox store 112 indicates that envelope journaling is enabled, but sending server 102 is not able to perform envelope journaling for one reason or another, the receiving server 104 will recognize that a journal e-mail message 126 has not been sent. The receiving server can send a journal e-mail message 130 to journal server 108 for delivery of a journal archive message 119 to journal mailbox store 118.

When there is no distribution list and the sending server 102 is able to perform envelope journaling functions for mailbox store 112, the journaling property in the e-mail message 122 will indicate that a journal e-mail message 126 has been sent to the journal server 108 for delivery of a journal archive message 119 to the journal mailbox store 118 for user B. The receiving server can thus recognize that no further journal e-mail messages need to be sent to document envelope information from the e-mail message 122.

Figure 5:
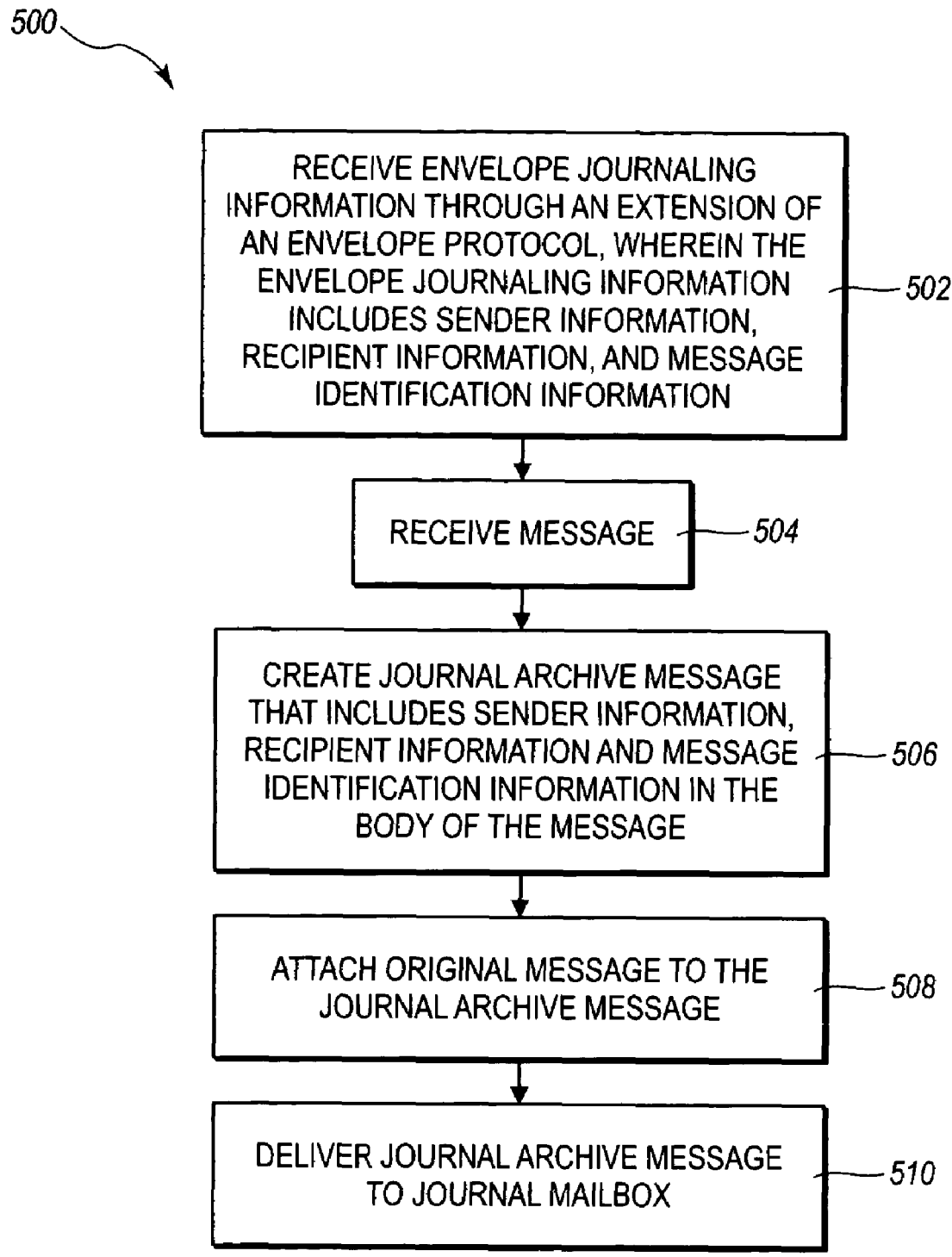
FIG. 5 illustrates a method of generating a journal archive message.

Referring now to FIG. 5, a method 500 illustrates various acts that may be performed by a journal server such as journal servers 106 and 108 (FIG. 1). A journal server may receive envelope journal information through an extension of an envelope protocol (act 502). The envelope journal information may include, for example, sender information, recipient information, and unique message identification. For example, and referring again to FIG. 2, a journal server that is configured like e-mail server 204 may receive an envelope 222. The envelope 222 may be part of an extended envelope protocol that allows for additional information to be sent in the envelope.

Referring now to FIG. 1, the extended envelope protocol may allow information, in addition to the information ordinarily received through the envelope such as current (or blank) sender information, current recipient and current message identification, to be received by a journal server 106 through the envelope of the journal e-mail message 128 identifying the original sender (user A) of the e-mail message 122, recipients (users B and C) of the e-mail message 122, and a unique identifier for the e-mail message 122.

The method 500 further includes receiving a message (act 504). Referring again to FIG. 2, a journal server such as e-mail server 204 may receive a message 220. This message is the same message or a similar message to the message that is included in the original e-mail message 122 sent by user A in the example shown in FIG. 1.

Figure 6:
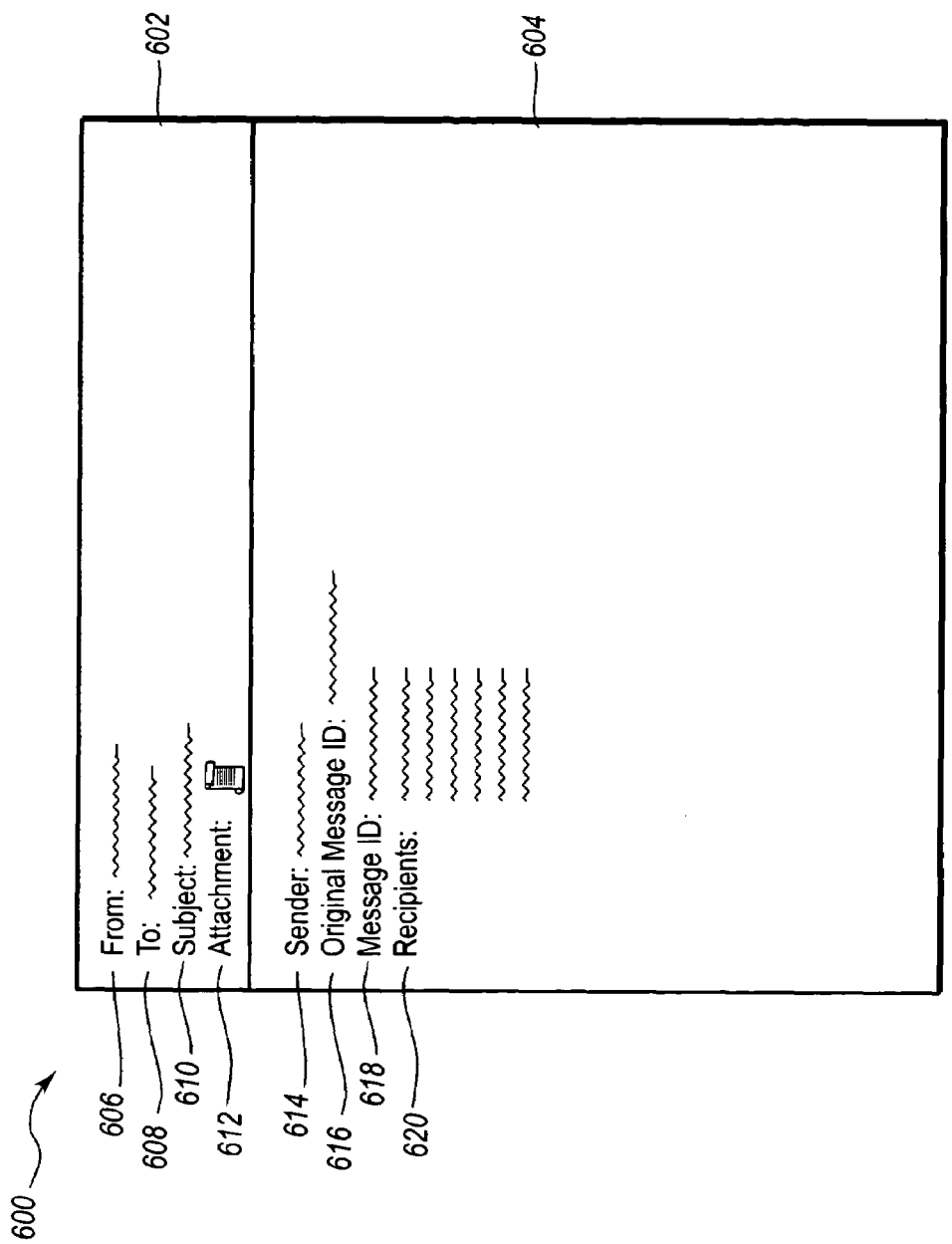
FIG. 6 illustrates an exemplary journal archive message.

The method further 500 includes creating a journal archive message that includes sender information, recipient information and message identification information in the body of the message (act 506). A journal server such as journal server 106 and/or 108 in FIG. 1 may perform this act 506. Referring to FIG. 6, an example of a journal archive message 600 is illustrated. The journal archive message 600 includes a header 602 and a body 604. Act 506 includes adding information identifying the original sender 614, information identifying recipients 620, and information identifying the original message 616. For example, referring to FIG. 1, information identifying the sender of the original e-mail message 122 (user A) may be included in the sender information 614.

Information identifying recipients of the message included in the original e-mail message 122 (users B and/or C) may be included in the recipients information 620. Information identifying the original e-mail message 122 may be included in the original message information 616. The journal message body 604 may include other information as well, such as information 618 identifying the journal message 600 itself. The journal message header 602 may include standard e-mail header information, including information identifying the sender 606 of the information in the journal message 600, the address of a journal mailbox store 608, and a subject line 610 which in one embodiment may include at least the subject of the original e-mail message, such as e-mail message 122 in FIG. 1.

Referring again to FIG. 5, the method 500 includes attaching the original message to the journal archive message (act 508). This is illustrated in FIG. 6, where the original message exists as an attachment 612. For example, the message included in the original e-mail message 122 in FIG. 1 may be included as an attachment 612 to the journal archive message 600. This results in a journal archive message that is similar to an undeliverable e-mail response to a sender that includes a message indicating that an e-mail is undeliverable while including the original message as an attachment.

Method 500 further includes delivering the journal archive message to the journal mailbox store (act 510). For example, referring to FIG. 1, the journal server 106 may deliver journal archive message 117 to journal mailbox store 116.

The journal e-mail messages 124, 126, 128, 130 received by the journal servers 106, 108 are MAPI messages, the body of which is the original message of e-mail message 122. The e-mail messages 124, 126, 128, 130 contain the journaling property, which includes all of the recipient information. The journaling mailboxes 116, 118 call the mail delivery and storage 212 (FIG. 2) to package the data in the journaling property to a journal archive message 117, 119 (FIG. 1) that is stored in the journal mailbox stores 116, 118.

The journal archive messages 117, 119 (FIG. 1), in the example shown are formed on the journal servers 106, 108 as described above to reduce computing resources required on other servers in the topology 100 such as the sending server 102 and the receiving server 104. The journal servers 106, 108 perform the functions of embedding envelope journaling content into the body 604 (FIG. 6) of a journal message 600 rather than requiring the other servers 102, 104 (FIG. 1) in the topology 100 to perform these functions. In other embodiments, other servers such as the sending server 102 and receiving server 104 may recognize e-mail messages as journal e-mail messages being sent to journaling servers 106, 108 and appropriately package the journal e-mail messages as described above.

An aggregation server 120 (FIG. 1) may be used to provide a complete journaling report. The aggregation server 120 may receive journal archive messages 117 and 119 from the journal servers 106 and 108. The aggregation server can then provide a complete report of all recipients and the sender of a message by reporting information based on the original message identification 616 (FIG. 6). All journal archive messages with the same original message identification 616 (FIG. 6) can have their information aggregated to provide a complete report.

The aggregation server 120 may have other beneficial functionality. For example, the aggregation server 120 may be able to filter e-mail messages on senders, recipients, or other parameters. In this way, the aggregation server can be used to create custom reports by filtering messages in various selectable ways. In particular, the organized structure of the journal archive messages 117, 119 makes them easily parable by various modules for filtering and manipulation. In addition, the aggregation server may include functionality including server side rules. These rules may forward particular types of messages or subject matters to a particular inbox. The rules may also have alerting functionality to alert via e-mail or otherwise when certain types of messages are journaled.

Envelope journaling described above may be performed for most types of messages that may exist in a topology 100 (FIG. 1). For example, envelope journaling may be used to journal ordinary e-mail messages, meeting requests, read receipts, out of office responses, rule based forwarded messages, undeliverable notices, appointment requests, non-read receipts and the like. Notably, envelope journaling is not ordinarily used for journal e-mail messages 124, 126, 128, 130. Envelope journaling these types of messages would result in journal e-mail message loops where journal e-mail messages would be sent for journal e-mail messages ad infinitum. To prevent journaling from being performed on journal e-mail messages, the journal e-mail messages may be marked with a property to identify them as journal e-mail messages. Messages marked with the property identifying them as journal e-mail messages may be excluded from envelope journaling.

While the embodiments described herein have been directed towards journaling information including the original sender, all recipients, and a unique message identifier, other information may also be journaled. Such information may include for example information indicating that an undeliverable notification was sent, that a message was forwarded, that a message was read, etc.

Figure 7:
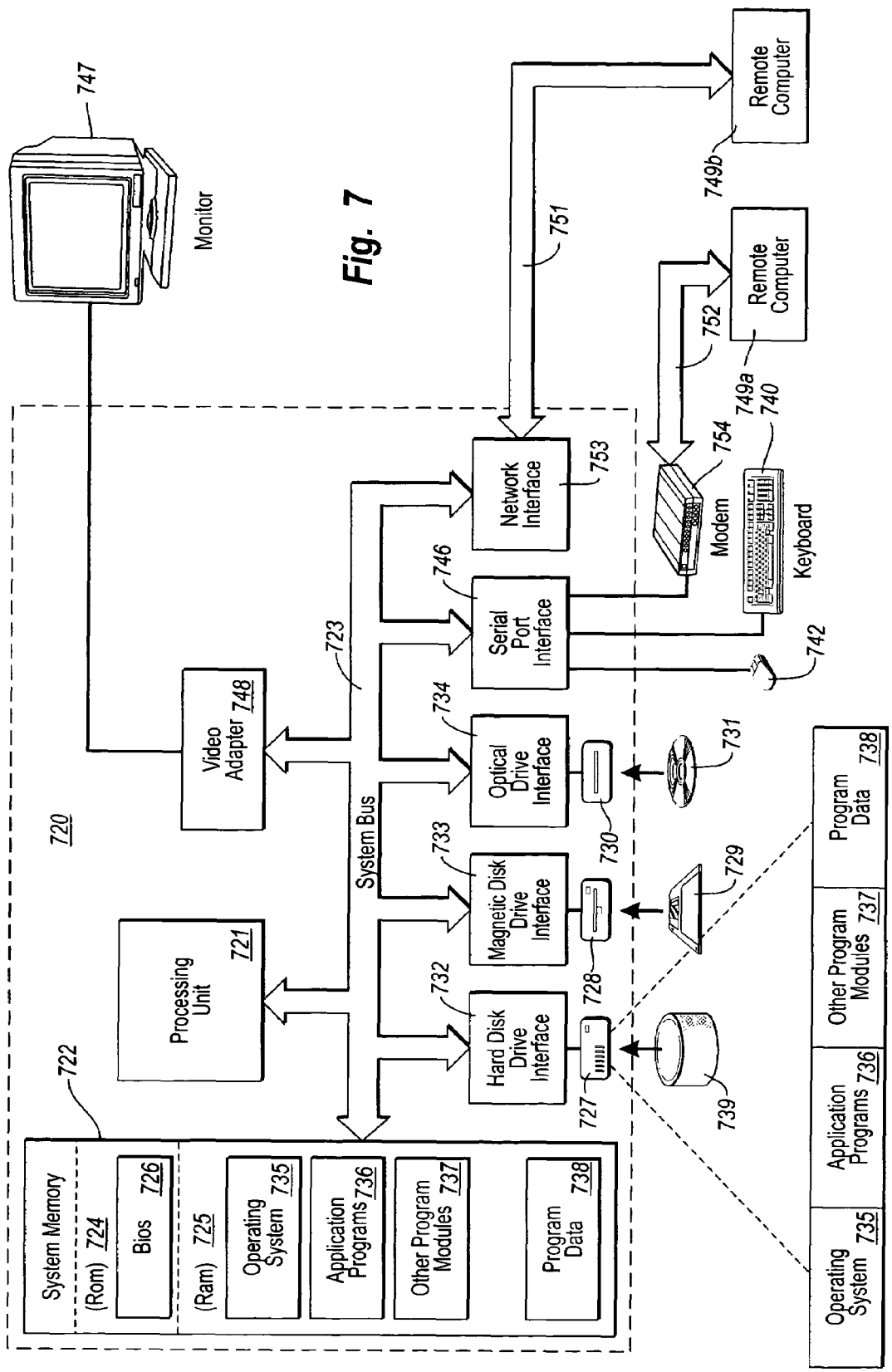
FIG. 7 illustrates one environment where certain aspects of the present invention may be practiced.

FIG. 7 and the following discussion are intended to provide a brief, general description of a suitable computing environment in which the invention may be implemented. With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721.

The system bus 723 may be any of several types of bus structures including a memory bus or memory controller, a peripheral bus, and a local bus using any of a variety of bus architectures. The system memory includes read only memory (ROM) 724 and random access memory (RAIN4) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

Figure 8:
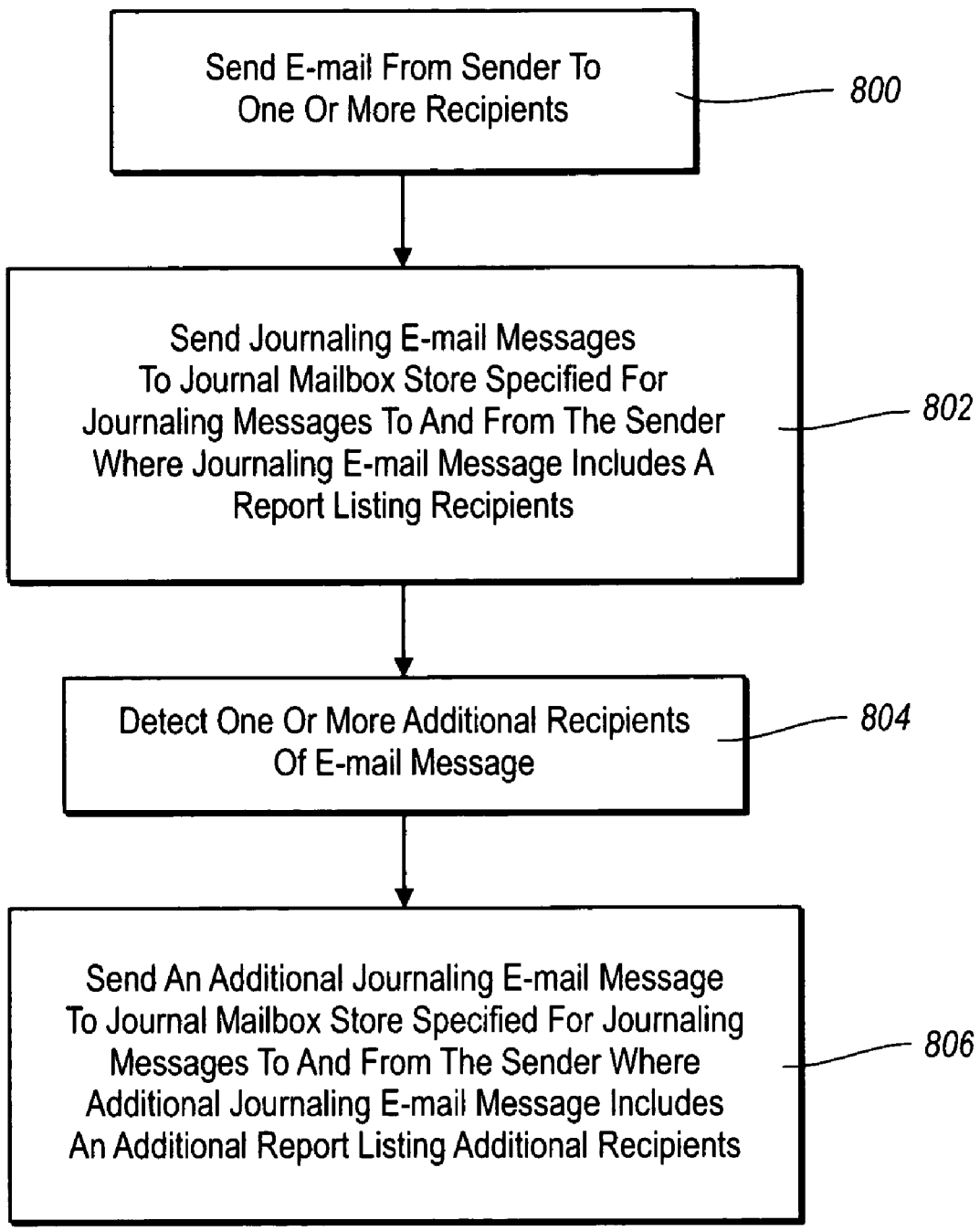
FIG. 8 illustrates a method for envelope journaling e-mail messages.

Referring now to FIG. 8, another method is illustrated by various acts that may be performed by one or more servers in a network environment topology with one or more e-mail servers. The method includes sending an e-mail message from a sender to one or more recipients (act 800). For example, and referring now to FIG. 1, User A may send an e-mail message 122 to recipients including User B and a distribution list. While the example shown in FIG. 1 illustrates the e-mail message 122 being delivered from sending server 102 to receiving server 104, other embodiments allow for the e-mail message 122 to be sent within a single e-mail server.

A journaling e-mail message 124 is sent to a journal mailbox store that has been specified for journaling messages to and from the sender (act 802). The journaling e-mail message includes a report listing the recipients designated in the original e-mail message 122. For example, the report includes information identifying user B as a recipient of the e-mail message 122.

The method in FIG. 8 illustrates an act of detecting one or more additional recipients of the e-mail message (act 804). For example, and referring again to FIG. 1, the receiving server 104 may detect that user C is added as an additional recipient of the e-mail message 122.

As discussed previously, one goal of envelope journaling is to collect a complete list of all recipients that have received a particular e-mail message. Thus, when new recipients are added due to the expansion of a distribution list, because of a forwarding rule, or for other reasons, these additional recipients should be recorded and journaled. This may be accomplished by sending an additional journaling e-mail message to the journal mailbox store specified for journaling messages to and from the sender (act 806). The additional journaling e-mail message may include an additional report listing the additional recipients. For example, and referring again to FIG. 1, the e-mail message 128 may be an additional journaling e-mail message that includes a report listing user C as an additional recipient of the original e-mail message 122.

The method illustrated in FIG. 8 allows for other acts to be performed as well. For example, envelope journaling may be enabled for one or more of the recipients of the e-mail message. Thus, the method shown in FIG. 8 allows for journaling e-mail messages and additional journaling e-mail messages that include reports detailing other recipients and the sender of the e-mail message. These journaling e-mail messages and additional journaling e-mail messages are sent to one or more journal mailbox stores specified for archiving messages to and from the recipient.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of sending journaling e-mail messages, wherein the method is performed at a server in a network environment topology including one or more e-mail servers, the e-mail servers including a capability to send and receive e-mails within the network environment topology, the method comprising:
    sending an e-mail message from a sender to one or more recipients;
    sending a first original journaling e-mail message to a journaling mailbox specified for journaling messages to and from the sender;
    wherein journaling mailboxes are specified on a per entity basis;
    wherein the first original journaling e-mail messages comprises a report listing the one or more recipients;
    detecting, after one or more original journaling e-mail messages have been sent, one or more additional recipients of the e-mail message, the one or more additional recipients being added to the e-mail message as a result of an expansion of a distribution list or as a result of a server invoking an alternate recipient forwarding rule;
    sending a first additional journaling e-mail message to the journaling mailbox specified for journaling messages to and from the sender; and
    wherein the first additional journaling e-mail message comprises an additional report listing at least one of the one or more additional recipients.

2. The method of claim 1, further comprising:
    determining that journaling is enabled for at least one of the one or more recipients;
    sending a second original journaling e-mail message to at least one journaling mailbox specified for journaling messages for the at least one or more recipients and;
    wherein the second original journaling e-mail message comprises a report listing the sender and at least one of the one or more recipients.

3. The method of claim 2, further comprising:
    sending a second additional journaling e-mail message to the at least one journaling mailbox specified for journaling messages for the at least one or more recipients; and
    wherein the second additional journaling e-mail message comprises an additional report listing at least one of the one or more additional recipients.

4. The method of claim 1, wherein the report comprises one or more recipient email addresses.

5. The method of claim 4, wherein the email address are at least one of an SMTP address, an X.400, address, an X.500, address, or an Exchange DN address.

6. The method of claim 1, wherein at least one of the e-mail message, the first original journaling e-mail message, and the first additional journaling e-mail message is sent within a single server.

7. The method of claim 1, wherein at least one of the e-mail message, the first original journaling e-mail message, and the first additional journaling e-mail message is sent between one or more servers.

8. The method of claim 1, further comprising receiving one or more e-mail messages derived from the first original journaling e-mail message and the first additional journaling email message at an aggregation server.

9. The method of claim 1, further comprising aggregating messages derived from the first original journaling e-mail message and the first additional journaling e-mail message into a single journal archive message.

10. The method of claim 9, wherein aggregating messages derived from the first original journaling e-mail message and the first additional journaling e-mail message into a single journal archive message comprises:
    creating a journal archive report comprising the one or more recipients and the at least one of the one or more additional recipients; and
    attaching at least a portion of the e-mail message to the journal archive report.

11. A computer program product for implementing a method of sending journaling e-mail message, wherein the computer program product is for use at a server in a network environment topology including one or more email servers, the email servers including capability to send and receive e-mails within the network environment topology, the computer program product comprising one or more computer-readable storage media having stored thereon computer-executable instructions that, when executed by a processor, cause the server to perform the following:
    sending an e-mail message from a sender to one or more recipients;
    sending a first original journaling e-mail message to a journaling mailbox specified for journaling messages to and from the sender;
    wherein journaling mailboxes are specified on a per entity basis;
    wherein the first original journaling e-mail message comprises a report listing the one or more recipients;
    detecting, after one or more original journaling e-mail messages have been sent, one or more additional recipients of the e-mail message, the additional recipients being added to the e-mail message as a result of an expansion of a distribution list or as a result of a server invoking an alternate recipient forwarding rule;
    sending a first additional journaling e-mail message to the journaling mailbox specified for journaling messages to and from the sender; and
    wherein the first additional journaling e-mail message comprises an additional report listing at least one of the one or more additional recipients.

12. The computer program product of claim 11, wherein the server is further caused to perform:
    determining that journaling is enabled for at least one of the one or more recipients;
    sending a second original journaling e-mail message to at least one journaling mailbox specified for journaling messages for the at least one or more recipients; and
    wherein the second original journaling e-mail message comprises a report listing the sender and at least one of the one or more recipients.

13. The computer program product of claim 12, wherein the server is further caused to perform:
    sending a second additional journaling e-mail message to the at least one journaling mailbox specified for journaling messages for the at least one or more recipients; and wherein the second additional journaling e-mail message comprises an additional report listing at least one of the one or more additional recipients.

14. A method of sending journaling e-mail messages, wherein the method is performed at a server in a network environment topology including one or more e-mail servers, the e-mail servers including a capability to send and receive e-mails within the network environment topology, the method comprising:

sending an e-mail message from a sender to one or more recipients;

sending a first journaling e-mail message to a journaling mailbox specified for journaling messages to and from the sender;

wherein journaling mailboxes are specified on a per entity basis;

wherein the first journaling e-mail message comprises a report listing the one or more recipients;

detecting, after the first journaling e-mail messages have been sent, one or more additional recipients of the e-mail message, the one or more additional recipients being added to the e-mail message as a result of an expansion of a distribution list or as a result of a server invoking an alternate recipient forwarding rule;

sending a second journaling e-mail message at least one of the additional recipients to the journaling mailbox specified for journaling messages to and from the sender;

wherein the second journaling e-mail message comprises an additional report listing at least one of the one or more additional recipients;

detecting that one or more additional journaling mailboxes are specified for the one or more of the-additional recipients of the email message on a per entity basis;

sending one or more additional journaling e-mail messages to the one or more additional journaling mailboxes; and wherein the one or more additional journaling e-mail messages comprises a report listing at least one of: at least one of the one or more recipients, at least one of the one or more additional recipients, or the sender.

* * * * *